(12) United States Patent
Yang et al.

(10) Patent No.: US 12,523,927 B2
(45) Date of Patent: Jan. 13, 2026

(54) PROJECTION DISPLAY APPARATUS

(71) Applicant: Huawei Technologies Co., Ltd., Shenzhen (CN)

(72) Inventors: Lebao Yang, Shenzhen (CN); Zhicong Xie, Shenzhen (CN); Bo Tian, Shenzhen (CN); Jing Zhang, Shenzhen (CN); Fei Zhao, Dongguan (CN); Jingfei Zhang, Dongguan (CN); Zhenlin Xie, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 528 days.

(21) Appl. No.: 17/922,235

(22) PCT Filed: Mar. 24, 2021

(86) PCT No.: PCT/CN2021/082502
§ 371 (c)(1),
(2) Date: Oct. 28, 2022

(87) PCT Pub. No.: WO2021/218499
PCT Pub. Date: Nov. 4, 2021

(65) Prior Publication Data
US 2023/0176461 A1    Jun. 8, 2023

(30) Foreign Application Priority Data

Apr. 30, 2020    (CN) .................. 202010368408.X (51) Int. Cl.
*G03B 21/16* (2006.01)
*G02B 27/10* (2006.01)
(Continued)

(52) U.S. Cl.
CPC ............. *G03B 21/16* (2013.01); *G02B 27/10* (2013.01); *G03B 21/006* (2013.01);
(Continued)

(58) Field of Classification Search
CPC .... G03B 21/005; G03B 21/006; G03B 21/16; G03B 21/28; G03B 21/2013;
(Continued)

(56) References Cited

U.S. PATENT DOCUMENTS 6,089,719 A    7/2000  Lin
6,819,365 B1 *  11/2004  Peng ................... H04N 9/3105
                                                       353/31
(Continued)

FOREIGN PATENT DOCUMENTS

CN    101546045 B    8/2012
CN    101776836 B    8/2013
(Continued)

*Primary Examiner* — Sultan Chowdhury
(74) *Attorney, Agent, or Firm* — Conley Rose, P.C.

(57) ABSTRACT

The optical machine module includes a light emitting module and a modulation module. The light emitting module includes a light source configured to emit linearly polarized light. The modulation module includes a modulation component. The modulation component includes a light-combining prism and a liquid crystal on silicon (LCOS) modulator. The light-combining prism includes four rectangular prisms. The light-combining prism has four sides and four intersection planes formed by the four rectangular prisms. The LCOS modulator includes a first LCOS modulator, a second LCOS modulator, and a third LCOS modulator. The first LCOS modulator, the second LCOS modulator, and the third LCOS modulator are respectively disposed on light emitting sides of three different sides. At least two of the four intersection planes are configured to split light. At least two of the four intersection planes are configured to combine light.

19 Claims, 7 Drawing Sheets

(51) Int. Cl.
  *G03B 21/00* (2006.01)
  *G03B 21/20* (2006.01)
  *G03B 21/28* (2006.01)

(52) U.S. Cl.
  CPC .... *G02B 2207/117* (2013.01); *G03B 21/2066* (2013.01); *G03B 21/28* (2013.01)

(58) Field of Classification Search
  CPC ............ G03B 21/2033; G03B 21/2053; G03B 21/2066; G02B 27/10; G02B 27/48; G02B 27/106; G02B 27/149
  See application file for complete search history.

(56) References Cited

U.S. PATENT DOCUMENTS

| | | | |
|---|---|---|---|
| 7,002,752 | B2 | 2/2006 | Chen et al. |
| 7,556,382 | B1 | 7/2009 | Berman |
| 2002/0176054 | A1 | 11/2002 | Mihalakis |
| 2003/0039036 | A1 | 2/2003 | Kruschwitz et al. |
| 2006/0171035 | A1* | 8/2006 | Berman ............ G02B 27/1026 359/618 |
| 2007/0242228 | A1 | 10/2007 | Chen et al. |
| 2008/0165327 | A1* | 7/2008 | Takagi ............... G03B 21/2033 372/19 |
| 2009/0213333 | A1 | 8/2009 | Chen |
| 2012/0147334 | A1 | 6/2012 | Mizushima et al. |
| 2012/0280941 | A1 | 11/2012 | Hu |
| 2013/0050291 | A1* | 2/2013 | Nobori ................. H04N 9/3197 345/690 |
| 2013/0271673 | A1 | 10/2013 | Katou |
| 2017/0115500 | A1 | 4/2017 | Tian et al. |
| 2018/0088452 | A1* | 3/2018 | Tajiri .................... G03B 33/12 |
| 2018/0131917 | A1 | 5/2018 | Sato et al. |
| 2020/0124952 | A1* | 4/2020 | Guo ..................... H04N 9/3158 |
| 2020/0209724 | A1* | 7/2020 | Itoh ........................ G03B 21/16 |
| 2021/0389652 | A1* | 12/2021 | Takano .............. G03B 21/2066 |

FOREIGN PATENT DOCUMENTS

| | | |
|---|---|---|
| CN | 105137610 A | 12/2015 |
| CN | 110376755 A | 10/2019 |
| JP | 2003098476 A | 4/2003 |
| JP | 2003149416 A | 5/2003 |
| JP | 2009031430 A | 2/2009 |
| JP | 2011215322 A | 10/2011 |
| JP | 2012123948 A | 6/2012 |
| WO | 2011161931 A1 | 12/2011 |
| WO | 2012086011 A1 | 6/2012 |
| WO | 2016175051 A1 | 11/2016 |

* cited by examiner

PROJECTION DISPLAY APPARATUS

CROSS-REFERENCE TO RELATED APPLICATIONS

This is a U.S. National Stage of International Patent Application No. PCT/CN2021/082502 filed on Mar. 24, 2021, which claims priority to Chinese Patent Application No. 202010368408.X filed on Apr. 30, 2020. Both of the aforementioned applications are hereby incorporated by reference in their entireties.

BACKGROUND

An existing projection display apparatus generally includes a light emitting module, a modulation module, and a lens module that are successively connected to each other. After light emitted from the light emitting module is modulated by the modulation module, the light is projected by the lens module to a specific position (for example, a screen) for displaying an image.

However, in a related technology, a modulation module based on a liquid crystal on silicon or reflective liquid crystal light valve (liquid crystal on silicon, LCOS) modulator generally uses a plurality of polarizing beam splitters (polarizing beam splitter, PBS) and one light-combining prism (also referred to as an X prism) to combine beams, thus needs a relatively large quantity of component parts, and has a relatively complex structure.

Therefore, currently, a projection display apparatus is urgently needed to resolve the foregoing problem.

SUMMARY

This application provides a projection display apparatus, to resolve a problem that a modulation module in a related technology has a relatively large quantity of component parts and a relatively complex structure.

An embodiment of this application provides a projection display apparatus. The projection display apparatus includes an optical machine module. The optical machine module includes a light emitting module and a modulation module. The light emitting module includes a light source that is configured to emit linearly polarized light. The modulation module includes a modulation component. The modulation component includes a light-combining prism and an LCOS modulator. The LCOS modulator is configured to generate modulated light and unmodulated light. The light-combining prism includes four rectangular prisms. The light-combining prism has four sides and four intersection planes formed by the four rectangular prisms. The LCOS modulator includes a first LCOS modulator, a second LCOS modulator, and a third LCOS modulator. The first LCOS modulator, the second LCOS modulator, and the third LCOS modulator are respectively disposed on light emitting sides of three different sides. At least two of the four intersection planes are configured to split light emitted from the light source in the light-combining prism. At least two of the four intersection planes are configured to combine light emitted from the light source in the light-combining prism.

After light is incident on the light-combining prism, beam splitting is implemented by using two intersection planes in the four intersection planes, that is, the light is decomposed into red light, green light, and blue light. Monochromatic light obtained after decomposition enters each LCOS modulator for modulation after passing through sides disposed opposite to the LCOS modulator, modulated monochromatic light then enters the light-combining prism to combine light after passing through the sides disposed opposite to each LCOS modulator, and combined light is emitted from one of the sides. A light-combining component in the modulation module in this application includes only the light-combining prism and the LCOS modulator, that is, a plurality of polarizing beam splitters are omitted. In this way, component parts of the light-combining component can be reduced, and a structure is simple, so that manufacturing costs and a forming size of the projection display apparatus can be reduced.

In a possible design, the light source includes a red laser light source configured to emit red light, a green laser light source configured to emit green light, and a blue laser light source configured to emit blue light. One beam of monochromatic light in the red light, the green light, and the blue light is in a first linear polarization state, the other two beams of monochromatic light are in a second linear polarization state, and the first linear polarization state and the second linear polarization state are different. One beam of monochromatic light with the first linear polarization state and two beams of monochromatic light with the second linear polarization state are used to form white light, so that the white light can be incident on the light-combining prism from a first high transparent surface or a second high transparent surface, and can be emitted from the light-combining prism through a third high transparent surface or a fourth high transparent surface.

In a possible design, two intersection planes are polarizing beam splitting planes, the other two intersection planes are dichroic planes, and the polarizing beam splitting planes and the dichroic planes are distributed alternately. In this way, white light splitting and combining can be implemented.

In a possible design, a metal wire grid is disposed on a polarizing beam splitting plane on which two beams of monochromatic light with different linear polarization states can be split. In this way, a beam splitting effect (that is, transmitting P-state light and reflecting S-state light) of blue light and green light is better, or a beam splitting angle is larger.

In a possible design, metal wire grids are disposed on the two polarizing beam splitting planes. In this way, a polarizing beam splitting effect of the red light can be better.

In a possible design, the light emitting module further includes a uniform light prism, the uniform light prism is disposed on a light emitting side of the green laser light source, and the uniform light prism is configured to weaken a speckle during laser projection. The speckle during laser projection can be weakened by disposing the uniform light prism.

In a possible design, the uniform light prism is disposed on a light emitting side of each of the green laser light source and the red laser light source. In this way, the costs and size of the projection display apparatus can be further reduced without affecting a projection effect.

In a possible design, the uniform light prism includes a plurality of parallelogram prisms arranged in sequence, and a semi-transparent and semi-reflective membrane is disposed on bevel edges of each parallelogram prism.

A length of a horizontal edge of the parallelogram prism is greater than a coherence length of incident light that is incident on the parallelogram prism. An optical path difference of light emitted from different paths is equal to the length of the horizontal edge of the parallelogram prism. Therefore, when the length of the horizontal edge of the parallelogram prism is greater than the coherence length of the incident light that is incident on the parallelogram prism, coherence of laser can be reduced, and a speckle during laser projection can be weakened.

In a possible design, there are two rows of uniform light prisms, and the two rows of uniform light prisms are symmetrically disposed along horizontal edges of the parallelogram prisms. In this way, a light intensity of emitted light can be more uniform, so that a speckle contrast ratio is smaller, and a speckle during laser projection can be further weakened.

In a possible design, the light emitting module further includes a beam-combining component, a first focusing lens, a diffusion wheel, and a collimating lens that are successively disposed along an optical path of the light source. The beam-combining component is configured to combine beams of red light, green light, and blue light, and the uniform light prism is disposed between the green laser light source and the beam-combining component corresponding to the green laser light source. In this way, light emitted from the light emitting module can be more uniform and a speckle has less impact.

In a possible design, the modulation module further includes a uniform light component. The uniform light component successively includes a compound eye lens array and a focusing lens along an optical path. The compound eye lens array is disposed on a light emitting side of the collimating lens, and the modulation component is disposed on a light emitting side of the focusing lens. In this way, uniform lighting generated on the LCOS modulator can be implemented, and a local dimming function can be implemented.

It should be understood that the foregoing general description and the following detailed description are merely examples, and do not limit this application.

REFERENCE NUMERALS 1-optical machine module;
11-light emitting module;
111-light source;
111a-red laser light source;
111b-green laser light source;
111c-blue laser light source;
112a-first dichroic mirror;
112b-first reflector;
112c-second dichroic mirror;
113-first focusing lens;
114-diffusion wheel;
115-collimating lens;
116-uniform light prism;
116a-parallelogram prism;
116b-semi-transparent and semi-reflective membrane;
117-first upper cover;
118-first lower cover;
119-first connector;
12-modulation module;
121-uniform light component;
121a-first compound eye lens array;
121b-second compound eye lens array;
121c-second focusing lens;
121d-second reflector;
121e-third focusing lens;
122-light-combining component;
122a-light-combining prism;
122a1-first high transparent surface;
122a2-second high transparent surface;
122a3-third high transparent surface;
122a4-fourth high transparent surface;
122a5-first intersection plane;
122a6-second intersection plane;
122a7-third intersection plane;
122a8-fourth intersection plane;
122b-metal wire grid;
122c-first LCOS modulator;
122d-second LCOS modulator;
122e-third LCOS modulator;
123-second upper cover;
124-second lower cover;
125-third upper cover;
126-third lower cover;
127-second connector;
128-heat sink;
13-lens module;
131-first lens group;
132-third reflector;
133-second lens group;
134-fourth reflector;
2-cooling module;
21-air cooling module;
211-first fan;
22-liquid cooling module;
221-heat dissipation patch;
222-liquid cooling heat sink;
223-second fan;
224-liquid pump;
3-control module;
31-signal transmitter;
32-driver;
33-main controller;
4-power supply;
5-housing.

The accompanying drawings herein are incorporated into the specification and constitute a part of the specification, illustrate embodiments that conform to this application, and are used together with the specification to describe the principles of this application.

DESCRIPTION OF EMBODIMENTS

To better understand the technical solutions of this application, the following describes embodiments of this application in detail with reference to the accompanying drawings.

It should be noted that the described embodiments are merely some but not all embodiments of this application. All other embodiments obtained by a person of ordinary skill in the art based on embodiments of this application without creative efforts shall fall within the protection scope of this application.

Terms used in embodiments of this application are merely for the purpose of describing specific embodiments, but are not intended to limit this application. The terms "a", "said" and "the" of singular forms used in embodiments and the appended claims of this application are also intended to include plural forms, unless otherwise specified in the context clearly.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be noted that nouns of locality such as "upper", "lower", "left", and "right" described in the embodiments of this application are described from perspectives shown in the accompanying drawings, and should not be construed as a limitation on the embodiments of this application. In addition, in the context, it should be further understood that when one element is connected "above" or "below" another element, the element can be directly connected "above" or "below" the another element, or may be indirectly connected "above" or "below" the another element by using an intermediate element.

Figure 1:
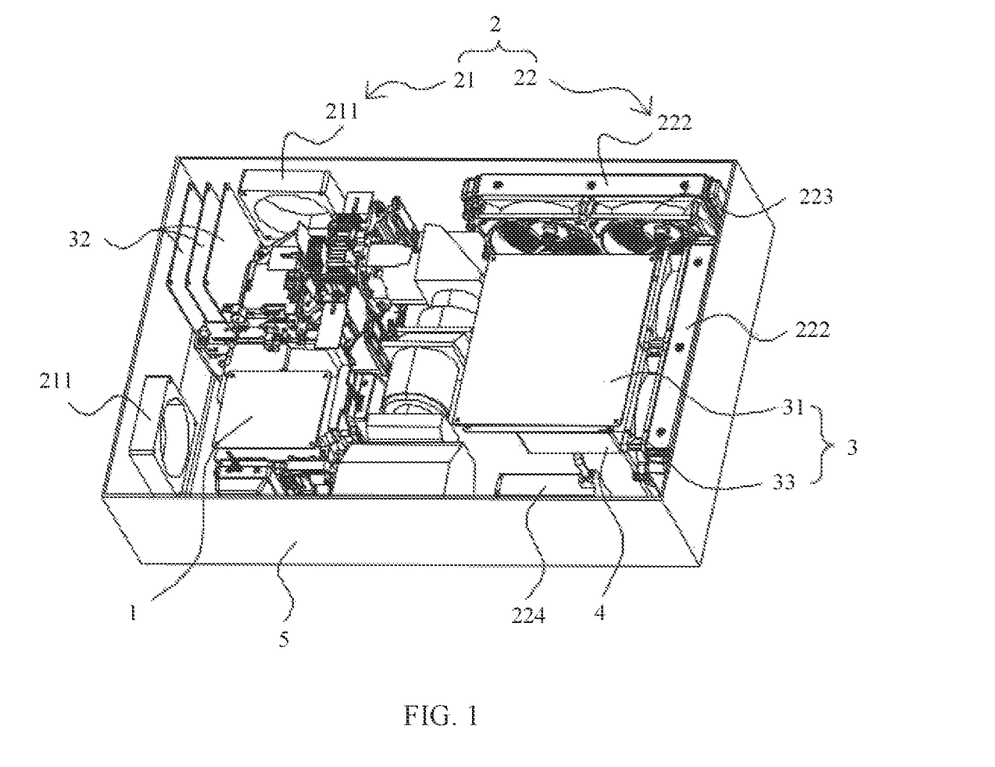
FIG. 1 is a schematic diagram of a structure of a projection display apparatus according to an embodiment of this application.
Figure 2:
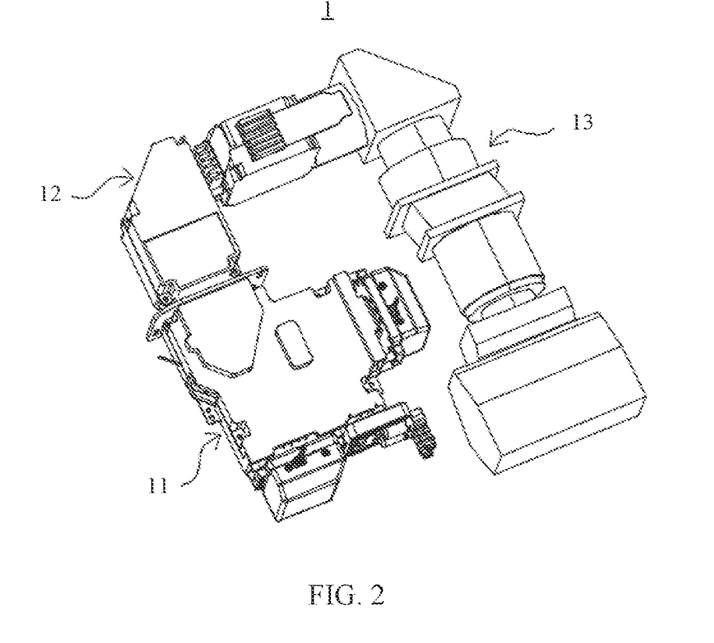
FIG. 2 is a schematic diagram of a structure of an optical machine module in the projection display apparatus shown in FIG. 1.

As shown in FIG. 1, the projection display apparatus includes a housing 5 (an upper cover disposed on the housing 5 is omitted in FIG. 1), and an optical machine module 1, a cooling module 2, and a control module 3 that are accommodated in the housing 5. The optical machine module 1 includes a light emitting module 11, a modulation module 12, and a lens module 13 that are successively connected (refer to FIG. 2). The cooling module 2 is configured to cool the optical machine module 1 and the control module 3. The control module 3 is configured to control the optical machine module 1 and the cooling module 2 to work.

The cooling module 2 includes an air cooling module 21 and a liquid cooling module 22. The air cooling module 21 and the liquid cooling module 22 may be fastened to a sidewall of the housing 5, or certainly may be fastened to another position of the housing 5. The air cooling module 21 includes a first fan 211. For example, the air cooling module 21 in FIG. 1 includes two first fans 211. One of the first fans 211 is opposite to the light emitting module 11 of the optical machine module 1, and the other first fan 211 is opposite to the modulation module 12 of the optical machine module 1. This is because the light emitting module 11 and the modulation module 12 are two parts of the optical machine module 1 that generate maximum heat. Further, the light emitting module 11 is a part of the optical machine module 1 that generates maximum heat. The liquid cooling module 22 includes a heat dissipation patch 221 (refer to FIG. 3), a liquid cooling heat sink 222, a cooling pipeline (not shown in the figure) connected between the heat dissipation patch 221 and the liquid cooling heat sink 222, a second fan 223 opposite to the liquid cooling heat sink 222, and a liquid pump 224 disposed on the cooling pipeline. In some implementations, the heat dissipation patch 221 is attached to the outside of a light source 111 (refer to FIG. 4) of the light emitting module 11, so as to rapidly and effectively absorb heat generated by the light source 111, thereby effectively improving a heat dissipation effect of the projection display apparatus.

The control module 3 includes a signal transmitter 31, a driver 32 connected to a modulator of the modulation module 12, and a main controller 33 separately connected to the signal transmitter 31 and the modulator. In some implementation solutions, all components such as the signal transmitter 31, the driver 32, and the main controller 33 may be PCB boards, and functional modules or devices that can implement the foregoing component functions are disposed on the PCB boards. An external image signal is transmitted to the main controller 33 by using the signal transmitter 31. The main controller 33 controls, based on the received image signal, the driver 32 to move. The driver 32 controls the modulator to modulate light emitted from the light source to obtain an image signal same as that being input into the projection display apparatus. In addition, the main controller 33 may further include but is not limited to controlling the light source 111 to emit light and the cooling module 2 to work. It may be understood that the control module 3 may also generate heat when working. The driver 32 may be disposed at a position adjacent to the modulation module 12. For example, the first fan 211 in FIG. 1 may be opposite to the driver 32 and the modulation module 12. It should be noted that each modulator is connected to one driver 32. For example, there are three drivers 32 in FIG. 1, that is, a projection display apparatus with three modulators is used in this application. Certainly, the projection display apparatus may alternatively use one modulator or two modulators based on an actual requirement. A type of the driver 32 may be a field-programmable gate array (field-programmable gate array, FPGA) chip, an application-specific integrated circuit (application-specific integrated circuit, ASIC) chip, a digital signal processor (digital signal processor, DSP) chip, or the like.

In addition, the projection display apparatus further includes a power supply 4, and the power supply 4 may be electrically connected to the optical machine module 1, the cooling module 2, and the control module 3, so as to supply power to the three. A type of the power supply 4 may be, for example, a lead storage battery or a lithium battery, which is not specifically limited in this application.

The following describes various parts of the optical machine module 1.

<Light Emitting Module 11>

The light emitting module 11 includes a light source 111 configured to emit polarized light. The light source 111 referred to in this application includes a case in which the light source 111 is a light emitting element that directly emits polarized light (for example, a semiconductor light emitting element, a semiconductor light emitting element array, or a light bulb light source), and also includes a case in which the light source 111 is a light emitting module 11 obtained by combining a light emitting element with another optical element and capable of emitting polarized light (for example, a light emitting module 11 obtained by combining a light emitting element and a lens, and a light emitting module 11 obtained by combining a light emitting element and a polarization conversion element). The light source described in this application may be considered as a light-emitting "black box", and the "black box" may include any type of optical element.

In this embodiment, the light source 111 is a laser light source, such as a laser diode light source, a laser diode array light source, or a laser device light source. The light source 111 has a characteristic of a small etendue, so that when entering the modulation module 12, the emitted polarized light has a relatively small light spot, a relatively small light divergence angle, and a relatively small etendue, which can avoid a case that a large quantity of light cannot be used because of a large divergence angle, improving light utilization. If another light source 111, such as a light bulb light source or an LED light source, is used, an etendue of the light source is far greater than an etendue of the laser light source. To make a light spot incident on a modulator apparatus meet a size of an incident surface, a light divergence angle will be enlarged. As a result, a large quantity of light cannot be used by the modulation module 12, and is absorbed and converted into heat outside an effective optical surface of the modulation module 12.

Certainly, in an environment in which a light utilization requirement is not high, the light bulb or LED light source may alternatively be used as the light source 111 of the light emitting module 11.

Figure 3:
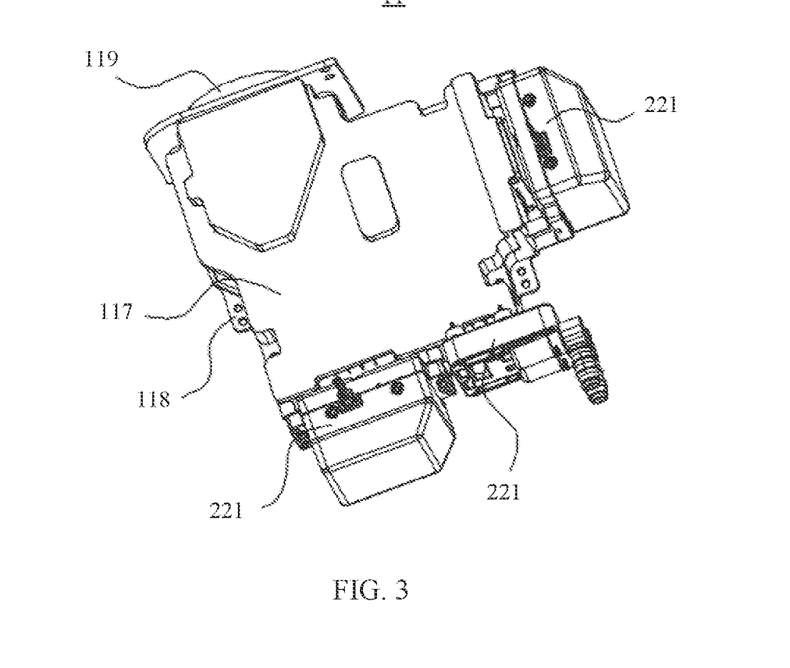
FIG. 3 is a schematic diagram of a structure of a light emitting module in the optical machine module shown in FIG. 2.
Figure 4:
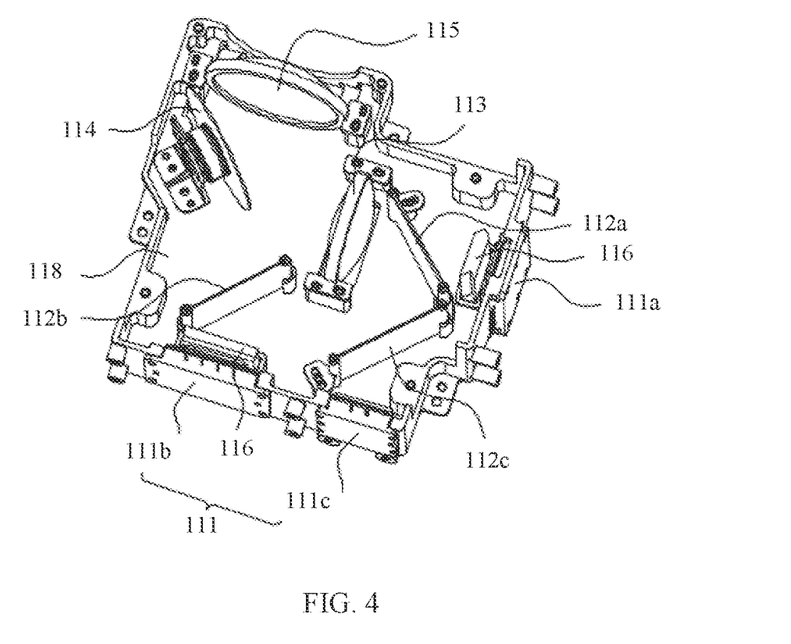
FIG. 4 is a schematic diagram of a structure of the light emitting module shown in FIG. 3 after a first upper cover is removed.

As shown in FIG. 4, FIG. 4 is a schematic diagram of decomposition of FIG. 3. In this embodiment, the light emitting module 11 includes a red laser light source 111a, a green laser light source 111b, and a blue laser light source 111c. The light emitting module 11 further includes a beam-combining component configured to combine beams of the three laser light sources, for example, may be a combination of a dichroic mirror and a focusing lens, or may be a combination of a dichroic mirror, a reflector, and a focusing lens. For example, the red laser light source 111a is located on one side, and the green laser light source 111b and the blue laser light source 111c are located on a side perpendicular to the red laser light source 111a. A first dichroic mirror 112a is disposed on a light emitting side of the red laser light source 111a, and the first dichroic mirror 112a is configured to transmit red light and reflect blue light and green light. A reflector is disposed on a light emitting side of the green laser light source 111b, and the reflector is configured to reflect green light. A second dichroic mirror 112c is disposed on a light emitting side of the blue laser light source 111c, and the second dichroic mirror 112c is configured to transmit blue light and reflect green light. A specific optical path is as follows: The red laser light source 111a emits red light. After passing through the first dichroic mirror 112a, the red light is incident on a first focusing lens 113. The blue laser light source 111c emits blue light. After passing through the second dichroic mirror 112c and the first dichroic mirror 112a, the blue light is incident on the first focusing lens 113. The green laser light source 111b emits green light. After passing through the first reflector 112b, the second dichroic mirror 112c, and the first dichroic mirror 112a, the green light is incident on the first focusing lens 113.

In some implementations, the light emitting module 11 further includes a diffusion wheel 114 and a collimating lens 115. The diffusion wheel 114 is configured to eliminate a laser speckle. The collimating lens 115 functions to enable light to be parallel and uniform within a longer distance range. Light emitted from the first focusing lens 113 is emitted after successively passing through the diffusion wheel 114 and the collimating lens 115, and is incident on the modulation module 12. The diffusion wheel 114 may be connected to a motor, so as to control rotation of the diffusion wheel 114 by using the motor, that is, the diffusion wheel 114 uniformly reflects, in a rotation manner, light incident on the diffusion wheel 114. In some implementations, the diffusion wheel 114 may be replaced by a diffusion sheet, and a difference between the diffusion sheet and the diffusion wheel 114 is that the diffusion sheet is fastened. From a perspective of eliminating the laser speckle, an effect of the diffusion wheel 114 is better than that of the diffusion sheet.

When a laser light source is used as a light source, a speckle may exist during projection. In some implementations, a uniform light prism 116 is disposed on a light emitting side (specifically, between the green laser light source 111b and the reflector) of the green laser light source 111b, and a function of the uniform light prism 116 is to weaken coherence of the laser light source itself, thereby weakening the speckle during projection. According to a visibility function, in a visible spectrum, a human eye is most sensitive to the middle (yellow green) of the spectrum, and is less sensitive to positions closer to both ends of the spectrum. Therefore, at least the uniform light prism 116 needs to be disposed on the light emitting side of the green laser light source 111b, so as to reduce impact of a human eye on a speckle generated by green light during projection.

Certainly, to improve a projection effect, the uniform light prism 116 may alternatively be disposed on a light emitting side (specifically, between the red laser light source 111a and the first dichroic mirror 112a) of the red laser light source 111a, or the uniform light prism 116 may be disposed on a light emitting side (specifically, between the green laser light source 111b and the reflector) of the blue laser light source 111c. For example, as shown in FIG. 4, the uniform light prism 116 is disposed on the light emitting side of the green laser light source 111b, and the uniform light prism 116 is also disposed on the light emitting side of the red laser light source 111a. In this implementation, the uniform light prism 116 is not disposed on the light emitting side of the blue laser light source 111c, so as to further reduce costs and a size without affecting the projection effect.

Still referring to FIG. 3 and FIG. 4, the light emitting module 11 includes a first upper cover 117 and a first lower cover 118 fastened to the first upper cover 117. A first cavity is formed between the first upper cover 117 and the first lower cover 118. The light emitting module 11 is further provided with a first connector 119 configured to connect to the modulation module 12, and the first connector 119 is fastened to the first upper cover 117 and the first lower cover 118. The foregoing components, such as the red laser light source 111a, the green laser light source 111b, and the blue laser light source 111c, the uniform light prism 116, the first dichroic mirror 112a, the second dichroic mirror 112c, the first reflector 112b, the first focusing lens 113, the diffusion wheel 114, and the collimating lens 115, are all accommodated in the first cavity, so as to protect the foregoing components by using the first upper cover 117 and the first lower cover 118.

The following describes a structure, a function, and a principle of the uniform light prism 116.

Figure 5:
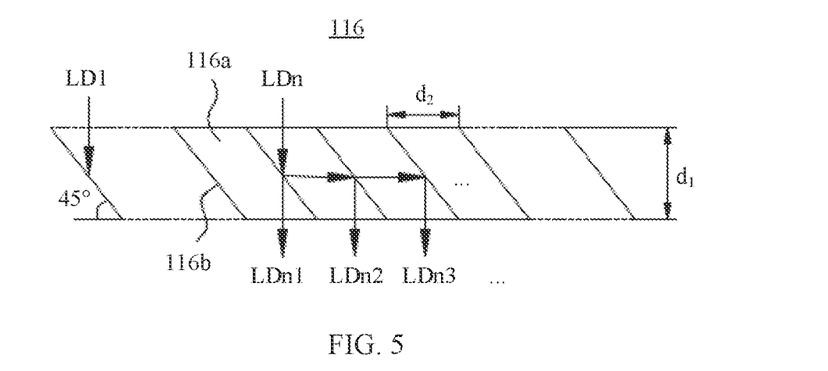
FIG. 5 is a schematic diagram of a structure of a uniform light prism according to an embodiment of this application.

FIG. 5 is a schematic diagram of a structure of the uniform light prism 116. In this implementation, the uniform light prism 116 includes a plurality of parallelogram prisms 116a arranged in sequence. For a prism, a plane on which light is incident or emitted is a side, and a plane perpendicular to the side is a principal section. According to a shape of the principal section, the prism may be classified into a triangular prism, a rectangular prism, a pentagonal prism, and a parallelogram prism.

A semi-transparent and semi-reflective membrane 116b is disposed on bevel edges of each parallelogram prism 116a, that is, after light is incident on the semi-transparent and semi-reflective membrane 116b, half of the light is reflected and the other half of the light is transmitted. It should be noted that, parallelogram prisms 116a at two ends of the uniform light prism 116 are not the case, because the parallelogram prisms 116a each have total reflection with the outside (which may be considered as a gas). Therefore, when incident light is incident on the parallelogram prisms 116a at two ends of the uniform light prism 116, the light is fully reflected. To ensure that reflected light is perpendicular to incident light, an angle between a bevel edge of each parallelogram prism 116a and a horizontal edge is 45 degrees. For example, the incident light is LDn (where LDn is not incident light at two ends of the uniform light prism 116, that is, LDn is not LD1), and emitted light after the incident light LDn passes through the parallelogram prism 116a is LDn1, LDn2, LDn3, and the like in sequence. An optical path of LDn1 is d1, an optical path of LDn2 is d1+d2, an optical path of LDn3 is d1+2d2, and so on. It may be learned that when LDn is LD1, an optical path of LD11 is d1+d2, an optical path of LD22 is d1+2d2, an optical path of LD23 is d1+3d2, and so on, where d1 is a distance between two horizontal edges of a parallelogram prism 116a, and d2 is a length of a horizontal edge of a parallelogram prism 116a. An application principle is as follows: Each laser beam emitted by a light source is divided into a plurality of laser beams after passing through the uniform light prism 116, and different paths are traveled by different laser beams, so that lengths of paths traveled by different emitted light such as LDn1 and LDn2 are different. When an optical path difference of emitted light of different paths is greater than a coherence length of incident light, coherence of laser can be reduced, and a speckle during laser projection can be weakened. For example, an optical path difference between LDn1 and LDn2 is d2. When d2 is greater than a coherence length of LDn, coherence of laser can be reduced, and a speckle during laser projection can be weakened.

Figure 6:
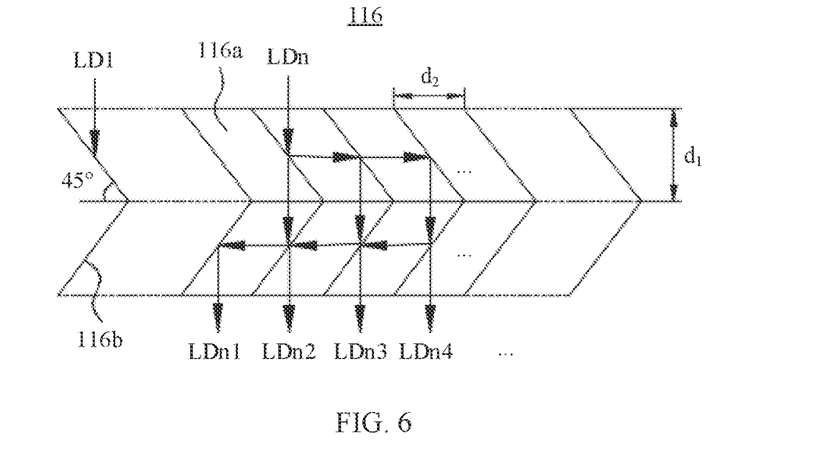
FIG. 6 is a schematic diagram of a structure of a uniform light prism according to another embodiment of this application.

FIG. 6 is a schematic diagram of another structure of a uniform light prism 116. A difference between the uniform light prism 116 provided in this implementation and the uniform light prism 116 shown in FIG. 5 lies in that there are two rows of uniform light prisms 116 shown in FIG. 5 that are symmetrically disposed. Specifically, the two rows of uniform light prisms 116 shown in FIG. 5 are symmetrically disposed along horizontal edges of a parallelogram prism 116a.

For example, incident light is LDn. and emitted light after the incident light LDn passes through the parallelogram prism 116a is LDn1, LDn2. LDn3, and the like in sequence. An optical path of LDn1 is 2d1+d2, an optical path of LDn2 is 2d1, an optical path of LDn3 is 2d1+d2, an optical path of LDn4 is 2d1+3d2, and so on. It may be learned that when LDn is LD1, an optical path of LD11 is 2d1+2d2, an optical path of LD22 is 2d1+d2, an optical path of LD23 is 2d1+2d2, and so on. That is, in this implementation, an optical path difference between two beams of adjacent emitted light is d2, which is consistent with that in the foregoing implementation. However, in this implementation, in addition to the principle in FIG. 5, a principle which is further based on includes: A size of a speckle is represented by a speckle contrast ratio, and the speckle contrast ratio depends on uniformity of light intensity. When light intensity of each emitted light is equal, according to a formula $C=1/\sqrt{N}$, C is a speckle contrast ratio, and N is a quantity of independent patterns. For example, when there are three beams of emitted light, N is equal to 3, and $C=1/\sqrt{3}$. When there is one beam of emitted light (which may be understood as that three or more beams of emitted light are superposed as one beam of emitted light), C=1, that is, only when the light intensity of the emitted light is more uniform, the speckle contrast ratio is smaller, and the speckle contrast ratio is closer to $1/\sqrt{N}$. That is, when the light intensity of the emitted light is more uniform, the speckle during laser projection can be further weakened.

LDn in FIG. 5 is used as an example. Light intensity of the incident light LDn is I. According to a semi-transparent and semi-reflective principle, light intensity of LDn1 is ½I, light intensity of LDn2 is ¼I. and light intensity of LDn3 is ⅛I. Light intensity of emitted light after LDn3 is less than that of LDn1 and that of LDn2, and can be ignored. LDn in FIG. 6 is used as an example. Light intensity of the incident light LDn is 1. According to a semi-transparent and semi-reflective principle, light intensity of LDn1 is about ⅓I, and light intensity of LDn2 is about ⅓I. Light intensity of each of LDn3 and emitted light after LDn3 is less than that of LDn1 and that of LDn2, and can be ignored. Therefore, it may be learned by comparing the light intensity of LDn1 and LDn2 in FIG. 5 and the light intensity of LDn1 and LDn2 in FIG. 6 that the speckle contrast ratio of LDn1 and LDn2 in FIG. 6 is smaller. Therefore, light intensity of emitted light of the uniform light prism 116 shown in FIG. 6 is more uniform than that of the uniform light prism 116 shown in FIG. 5, so that the speckle during laser projection can be further weakened.

<Modulation Module 12>

Figure 7:
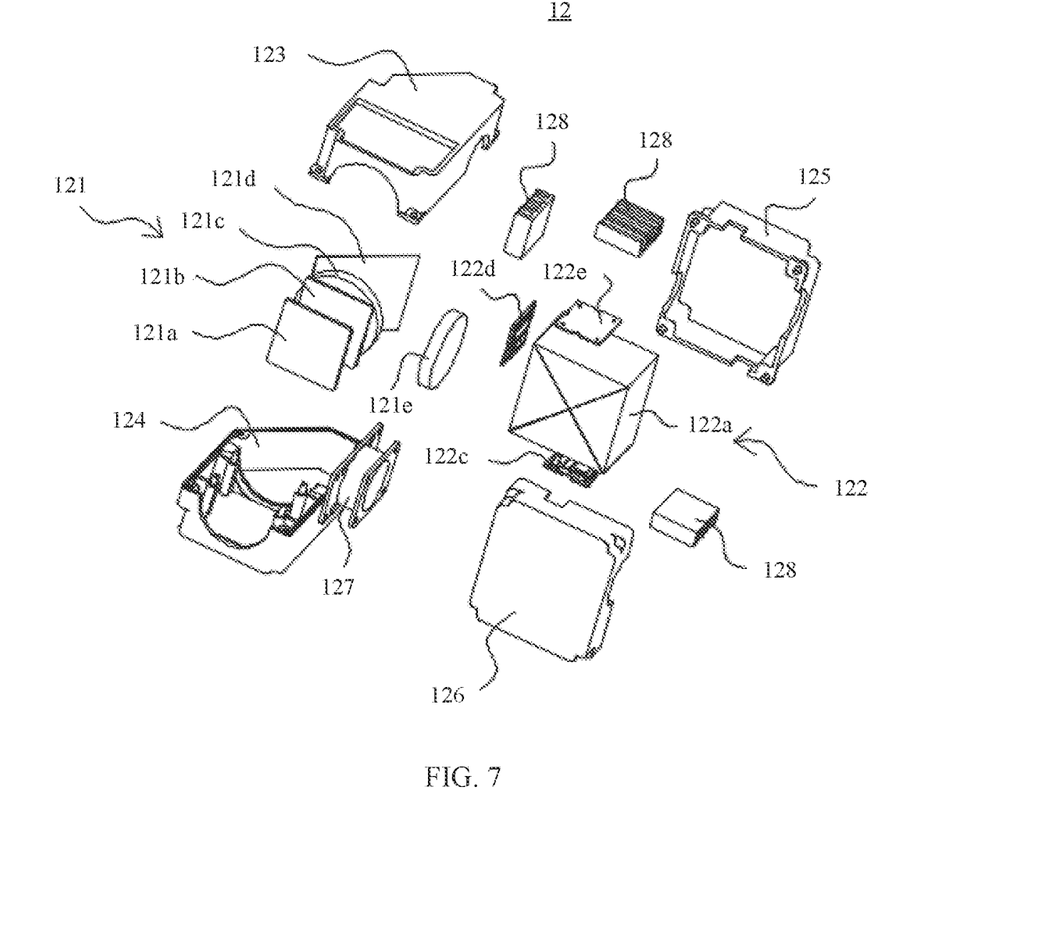
FIG. 7 is a schematic diagram of decomposition of a modulation module in the light emitting module shown in FIG. 3.

As shown in FIG. 7, the modulation module 12 includes a second upper cover 123 and a second lower cover 124 fastened to the second upper cover 123, a second cavity is formed between the second upper cover 123 and the second lower cover 124, and the second cavity is configured to accommodate a uniform light component 121. The modulation module 12 further includes a third upper cover 125 and a third lower cover 126 fastened to the third upper cover 125, a third cavity is formed between the third upper cover 125 and the third lower cover 126, and the third cavity is configured to accommodate a light-combining component 122. The modulation module 12 further includes a second connector 127, and the second connector 127 is configured to connect to the uniform light component 121 and the light-combining component 122. For example, one end of the second connector 127 is fastened to the second upper cover 123 and the second lower cover 124, and the other end is fastened to the third upper cover 125 and the third lower cover 126.

The uniform light component 121 is disposed on a light emitting side of a light emitting module 11. Specifically, the uniform light component 121 is disposed on a light emitting side of a collimating lens 115. For example, the light emitting module 11 is connected to the second upper cover 123 and the second lower cover 124 of the modulation module 12 by using a first connector 119. The uniform light component 121 includes a compound eye lens array and a focusing lens. Light emitted from the light emitting module 11 first passes through the compound eye lens array, and then passes through the focusing lens, so that the light is irradiated on an LCOS modulator. In addition, by using the compound eye lens array and the focusing lens, uniform lighting generated on the LCOS modulator can be implemented, and a local dimming function can be implemented.

In some other implementation solutions, the compound eye lens array may be replaced with an optical wand, and the optical wand may be a solid optical wand or a hollow optical wand. In this implementation, the compound eye lens array includes two columns of first compound eye lens arrays 121a and second compound eye lens arrays 121b that are arranged in parallel, and the focusing lens includes a second focusing lens 121c and a third focusing lens 121e. In this way, uniform lighting can be implemented. A specific implementation principle is not described herein.

In this implementation, there is an angle between the uniform light component 121 and the light-combining component 122. For example, the uniform light component 121 and the light-combining component 122 may be disposed vertically, so that structural compactness can be improved. Therefore, a reflector may be disposed in the uniform light component 121, for example, a second reflector 121d may be disposed between a first focusing lens 113 and the second focusing lens 121c. Certainly, the uniform light component 121 and the light-combining component 122 may alternatively be disposed in parallel. In this way, the uniform light component 121 does not need to be disposed with a reflector, and in this case, the first focusing lens 113 and the second focusing lens 121c are also disposed in parallel.

Figure 8:
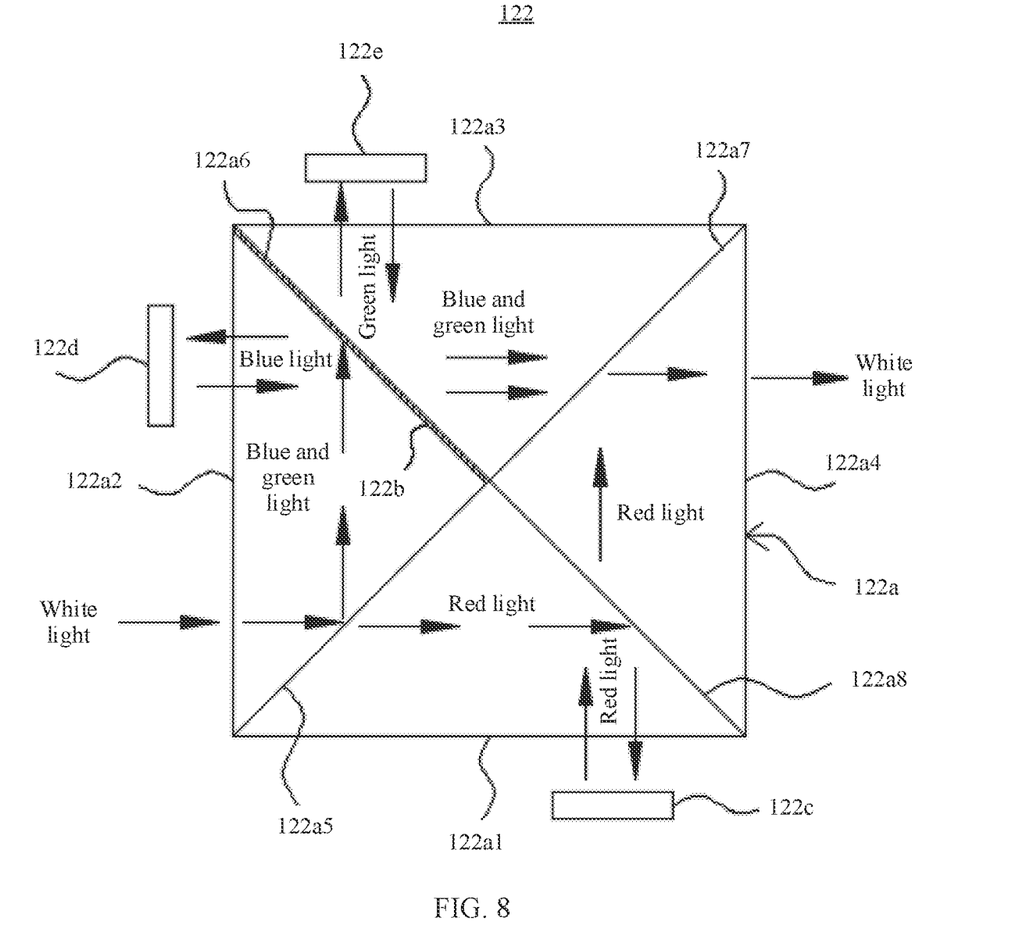
FIG. 8 is a schematic diagram of a structure of a light-combining component in the modulation module shown in FIG. 7.

As shown in FIG. 8, the light-combining component 122 includes a light-combining prism 122a and an LCOS modulator. The light-combining prism 122a includes four rectangular prisms. The light-combining prism 122a has four sides and four intersection planes formed by the four rectangular prisms. Two adjacent sides in the four sides are perpendicular to each other, and two adjacent intersection planes in the four intersection planes are perpendicular to each other. In this implementation, the four sides are respectively a first high transparent surface 122a1, a second high transparent surface 122a2, a third high transparent surface 122a3, and a fourth high transparent surface 122a4, so that white light can be incident into the light-combining prism 122a at high transmittance or emitted from the light-combining prism 122a, thereby improving light utilization. The four intersection planes are respectively a first intersection plane 122a5, a second intersection plane 122a6, a third intersection plane 122a7, and a fourth intersection plane 122a8. At least two of the four intersection planes are configured to split light emitted from a light source 111 in the light-combining prism 122a, and at least two of the four intersection planes are configured to combine light emitted from the light source 111 in the light-combining prism 122a. For example, the first intersection plane 122a5 and the second intersection plane 122a6 can split light emitted from the light source 111 in the light-combining prism 122a, and the second intersection plane 122a6 and the third intersection plane 122a7 can combine light emitted from the light source 111 in the light-combining prism 122a. For specific description, refer to the following. Therefore, the four intersection planes are disposed to have different optical characteristics, so as to implement splitting and combining of white light. For example, it may be specified that the first intersection plane 122a5 intersects the first high transparent surface 122a1 and the second high transparent surface 122a2 separately, the second intersection plane 122a6 intersects the second high transparent surface 122a2 and the third high transparent surface 122a3 separately, the third intersection plane 122a7 intersects the third high transparent surface 122a3 and the fourth high transparent surface 122a4 separately, and the fourth intersection plane 122a8 intersects the fourth high transparent surface 122a4 and the first high transparent surface 122a1 separately.

In this implementation, there are three LCOS modulators, which are respectively a first LCOS modulator 122c, a second LCOS modulator 122d, and a third LCOS modulator 122e. Each LCOS modulator is disposed on a light emitting side of one side of the light-combining prism 122a. After light is incident on the light-combining prism 122a, beam splitting is implemented by using two intersection planes in the four intersection planes, that is, the light is decomposed into red light, green light, and blue light. Monochromatic light obtained after decomposition enters each LCOS modulator for modulation after passing through sides disposed opposite to the LCOS modulator, modulated monochromatic light then enters the light-combining prism 122a to combine light after passing through the sides disposed opposite to each LCOS modulator, and combined light is emitted from one of the sides.

It should be noted that a structure of a modulation module disclosed in a related technology is relatively complex, and has a relatively large quantity of component parts. For example, in the patent of application No. 200910251608.0, a modulation module based on an LCOS modulator provided in this patent performs beam combining by using a plurality of polarizing beam splitters and one light-combining prism. A structure of the modulation module is complex, and a forming size of a projection display apparatus is also increased. However, the light-combining component 122 in the modulation module 12 in this application includes only the light-combining prism 122a and the LCOS modulator, that is, a plurality of polarizing beam splitters are omitted. In this way, component parts of the light-combining component 122 can be reduced, and a structure is simple, so that a forming size of a projection display apparatus can be reduced.

A heat sink 128 is further disposed on the outside of the light-combining component 122. For example, the heat sink 128 may be fastened (for example, affixed) to the third upper cover 125 and/or the third lower cover 126, and the outside of each LCOS modulator has one corresponding heat sink 128, so as to perform good heat dissipation on each LCOS modulator by disposing the heat sink 128. In some implementation solutions, the heat sink 128 may be a fin.

Still referring to FIG. 8, in this implementation, the first LCOS modulator 122c is disposed on a side of the first high transparent surface 122a1, the second LCOS modulator 122d is disposed on a side of the second high transparent surface 122a2, and the third LCOS modulator 122e is disposed on a side of the third high transparent surface 122a3. Light emitted from the light emitting module 11 is white light, one beam of monochromatic light is in a first linear polarization state (for example, an S state or a P state), and the other two beams of monochromatic light are in a second linear polarization state (for example, a P state or an S state). The white light may be incident on the light-combining prism 122a from the first high transparent surface 122a1 or the second high transparent surface 122a2, and may be emitted from the light-combining prism 122a through the third high transparent surface 122a3 or the fourth high transparent surface 122a4.

In an example, the first LCOS modulator 122c is configured to modulate red light, the second LCOS modulator 122d is configured to modulate blue light, and the third LCOS modulator 122e is configured to modulate green light. The light emitted from the light emitting module 11 is white light. The green light is P-state polarized light, and the red light and the blue light are S-state polarized light. The white light is incident on the light-combining prism 122a from the second high transparent surface 122a2, and is emitted from the light-combining prism 122a through the fourth high transparent surface 122a4. In this example, the first intersection plane 122a5 has an optical characteristic of high transmittance for red light and high reflection for blue and green light, that is, the first intersection plane 122a5 is a dichroic plane. The second intersection plane 122a6 has an optical characteristic of transmitting P-state polarized light and reflecting S-state polarized light, that is, the second intersection plane 122a6 is a polarizing beam splitting plane. The third intersection plane 122a7 has an optical characteristic of high transmittance for blue and green light and high reflection for red light, that is, the third intersection plane 122a7 is a dichroic plane. The fourth intersection plane 122a8 has an optical characteristic of transmitting P-state polarized light and reflecting S-state polarized light, that is, the fourth intersection plane 122a8 is a polarizing beam splitting plane. That is, two intersection planes are polarizing beam splitting planes, the other two intersection planes are dichroic planes, and the polarizing beam splitting planes and the dichroic planes are distributed alternately. In this way, white light splitting and combining can be implemented.

In another example, details are not described herein. It should be noted that monochromatic light modulated by the first LCOS modulator 122c, the second LCOS modulator 122d, and the third LCOS modulator 122e is not limited, and references may be made to Table 1. One beam of monochromatic light constituting the white light is in the first linear polarization state (for example, an S state or a P state), and the other two beams of monochromatic light are in the second linear polarization state (for example, a P state or an S state). Aside of the light-combining prism 122a on which the white light is incident is one of two adjacent high transparent surfaces (for example, the first high transparent surface 122a1 or the second high transparent surface 122a2), and a side of the light-combining prism 122a on which combined light is emitted is one of the other two adjacent high transparent surfaces (for example, the third high transparent surface 122a3 or the fourth high transparent surface 122a4). The foregoing cases may be freely combined.

TABLE 1

|  | First LCOS modulator 122c | Second LCOS modulator 122d | Third LCOS modulator 122e |
| --- | --- | --- | --- |
| Combination 1 | Red light | Green light | Blue light |
| Combination 2 | Red light | Blue light | Green light |
| Combination 3 | Green light | Red light | Blue light |
| Combination 4 | Green light | Blue light | Red light |
| Combination 5 | Blue light | Red light | Green light |
| Combination 6 | Blue light | Green light | Red light |

The following describes an optical path (that is, the uniform light component 121 is ignored herein) of light in the light-combining component 122 by using a case shown in the foregoing example.

(1) The white light emitted from the light emitting module 11 is incident on the first intersection plane 122a5 after passing through the second high transparent surface 122a2, and S-state red light is incident on the fourth intersection plane 122a8 after passing through the first intersection plane 122a5. After passing through the fourth intersection plane 122a8, the S-state red light is reflected and incident on the first high transparent surface 122a1. The red light passing through the first high transparent surface 122a1 is incident on the first LCOS modulator 122c, and becomes P-state red light after being modulated by the first LCOS modulator 122c. The P-state red light is reflected by the first LCOS modulator 122c and then successively passes through the first high transparent surface 122a1, the fourth intersection plane 122a8, and the third intersection plane 122a7. The red light is reflected from the third intersection plane 122a7 and is incident on the fourth high transparent surface 122a4, and finally, modulated red light is emitted from the fourth high transparent surface 122a4.

(2) The white light emitted from the light emitting module 11 is incident on the first intersection plane 122a5 after passing through the second high transparent surface 122a2, and S-state blue light is reflected to the second intersection plane 122a6 after passing through the first intersection plane 122a5. After passing through the second intersection plane 122a6, the S-state blue light is reflected and incident on the second high transparent surface 122a2. The blue light passing through the second high transparent surface 122a2 is incident on the second LCOS modulator 122d, and becomes P-state blue light after being modulated by the second LCOS modulator 122d. The P-state blue light is reflected by the second LCOS modulator 122d and then successively passes through the second high transparent surface 122a2, the second intersection plane 122a6, the third intersection plane 122a7, and the fourth high transparent surface 122a4. Finally, modulated blue light is emitted from the fourth high transparent surface 122a4.

(3) The white light emitted from the light emitting module 11 is incident on the first intersection plane 122a5 after passing through the second high transparent surface 122a2, and P-state green light is reflected to the second intersection plane 122a6 after passing through the first intersection plane 122a5. After passing through the second intersection plane 122a6, the P-state green light is incident on the third high transparent surface 122a3. The green light passing through the third high transparent surface 122a3 is incident on the third LCOS modulator 122e, and becomes S-state green light after being modulated by the third LCOS modulator 122e. The S-state green light is reflected by the third LCOS modulator 122e and then successively passes through the third high transparent surface 122a3, the second intersection plane 122a6, the third intersection plane 122a7, and the fourth high transparent surface 122a4. Finally, modulated green light is emitted from the fourth high transparent surface 122a4.

In addition, for the second intersection plane 122a6, because the second intersection plane 122a6 functions as a polarizing beam splitting function for the blue light and the green light, to make a beam splitting effect of the blue light and the green light (that is, transmitting P-state light and reflecting S-state light) better or a beam splitting angle greater, disposing a metal wire grid 122b on the second intersection plane 122a6 may be considered, for example, the metal wire grid 122b may be affixed to the second intersection plane 122a6. That is, the metal wire grid 122b is disposed on a polarizing beam splitting plane for beam splitting and through which two beams of monochromatic light in different linear polarization states pass. For the fourth intersection plane 122a8, because the fourth intersection plane 122a8 functions as a polarizing beam splitting function on the red light, a film-coated surface that has a polarizing beam splitting characteristic can implement a polarizing beam splitting function on the red light. Certainly, to make a polarizing beam splitting effect of the fourth intersection plane 122a8 better, the metal wire grid 122b may be disposed on the fourth intersection plane 122a8.

<Lens Module 13>

Figure 9:
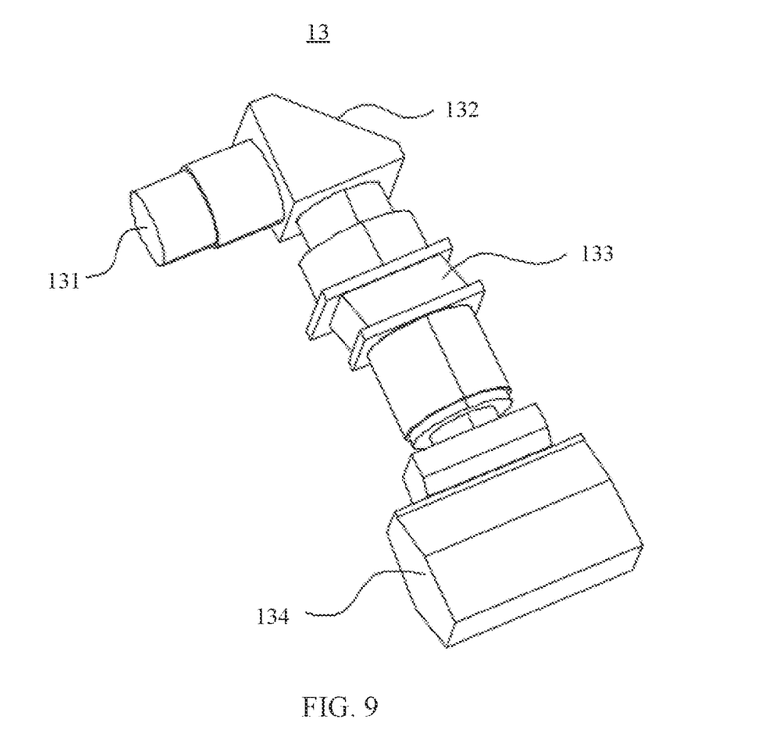
FIG. 9 is a schematic diagram of a structure of a lens module in the light emitting module shown in FIG. 3.

As shown in FIG. 9, the lens module 13 is connected to the light-combining component 122, and light emitted from the light-combining component 122 can be incident on the lens module 13. In some implementations, the lens module 13 includes a first lens group 131, a third reflector 132, a second lens group 133, and a fourth reflector 134 that are successively connected, where the first lens group 131 is connected to the light-combining component 122, and finally, emitted light of the projection display apparatus is emitted from the fourth reflector 134. A specific composition of the lens module 13 is merely used as an example of the lens module 13 in this implementation. The lens module 13 may be disposed based on an actual requirement. For example, the lens module 13 may be disposed with only an emitting lens (for example, the first lens group 131).

Figure 10:
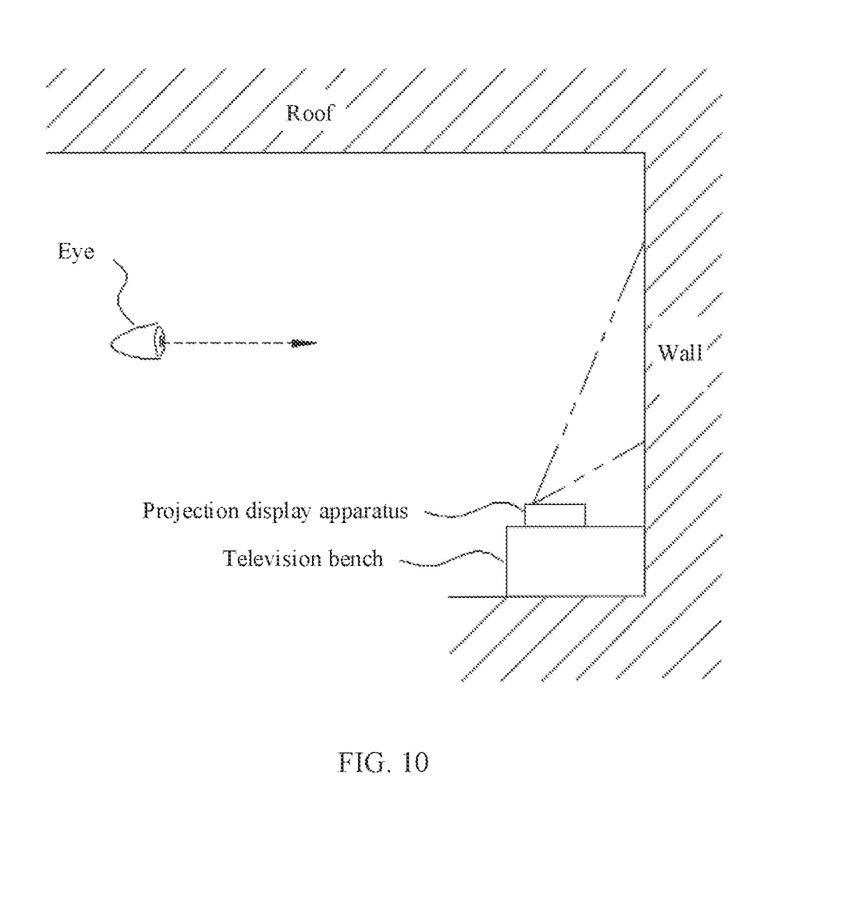
FIG. 10 is a schematic diagram of an application scenario of a projection display apparatus according to an embodiment of this application.

The projection display apparatus provided in this application may include an engineering projector, a cinema projector, a laser television, a home theater, an education projector, a portable micro projector, and the like. The projection display apparatus may be placed on a horizontal plane, or may be hung on a roof by using a davit. For example, as shown in FIG. 10, the projection display apparatus may be placed on a horizontal plane, such as a ground or a table (such as a television bench), and is configured to enlarge and project image light to a projection surface such as a wall or a screen.

The foregoing describes merely preferred embodiments of this application, which are not intended to limit this application. For a person skilled in the art, various modifications and changes may be made in this application. Any modification, equivalent replacement, or improvement made without departing from the spirit and principle of this application shall fall within the protection scope of this application.

What is claimed is:

1. A projection display apparatus comprising:
    an optical machine device comprising:
        a light emitting device comprising a light source configured to emit linearly polarized light, wherein the light source comprises a red laser light source configured to emit red light, a green laser light source configured to emit green light, and a blue laser light source configured to emit blue light, wherein one beam of monochromatic light in the red light, the green light, and the blue light is in a first linear polarization state, wherein another two beams of the monochromatic light are in a second linear polarization state, and wherein the first linear polarization state and the second linear polarization state are different; and
        a modulation device comprising a modulation component, wherein the modulation component comprises:
            a light-combining prism comprising four rectangular prisms, four sides, and four intersection planes formed by the four rectangular prisms, wherein first two intersection planes are configured to split the linearly polarized light in the light-combining prism, and wherein another two intersection planes are configured to combine the linearly polarized light in the light-combining prism; and
            a liquid crystal on silicon (LCOS) modulator configured to generate modulated light, and comprising a first LCOS modulator, a second LCOS modulator, and a third LCOS modulator respectively disposed on light emitting sides of three different sides of the light-combining prism.

2. The projection display apparatus of claim 1, wherein the light source further comprises a semiconductor light-emitting element or a light bulb.

3. The projection display apparatus of claim 1, wherein the first two intersection planes are polarizing beam splitting planes, wherein the other two intersection planes are dichroic planes, and wherein the polarizing beam splitting planes and the dichroic planes are distributed alternately.

4. The projection display apparatus of claim 3, further comprising a metal wire grid disposed on a polarizing beam splitting plane on which two beams of monochromatic light with different linear polarization states can be split.

5. The projection display apparatus of claim 3, further comprising metal wire grids disposed on the polarizing beam splitting planes.

6. The projection display apparatus of claim 1, wherein the light emitting device further comprises a uniform light prism disposed on a light emission side of the green laser light source, and configured to weaken a speckle during laser projection.

7. The projection display apparatus of claim 6, wherein the uniform light prism is disposed on a light output side of each of the green laser light source and the red laser light source.

8. The projection display apparatus of claim 6, wherein the uniform light prism comprises a plurality of parallelogram prisms arranged in sequence, wherein a semi-transparent and semi-reflective membrane is disposed on bevel edges of each parallelogram prism, and wherein a length of a horizontal side of a parallelogram prism is greater than a coherence length of incident light on the parallelogram prism.

9. The projection display apparatus of claim 8, further comprising two rows of uniform light prisms symmetrically disposed along horizontal edges of the parallelogram prisms.

10. The projection display apparatus of claim 6, wherein the light emitting device further comprises a beam-combining component configured to combine beams of the red light, the green light, and the blue light, a first focusing lens, a diffusion wheel, and a collimating lens that are sequentially disposed along an optical path of the light source, and wherein the uniform light prism is disposed between the green laser light source and the beam-combining component corresponding to the green laser light source.

11. The projection display apparatus of claim 10, wherein the modulation device further comprises a uniform light component, wherein the uniform light component successively comprises a compound eye lens array and a focusing lens along an optical path, wherein the compound eye lens array is disposed on a light emitting side of the collimating lens, and wherein the modulation component is disposed on a light emitting side of the focusing lens.

12. The projection display apparatus of claim 11, further comprising a cooling device and a control device, wherein the cooling device is configured to cool the optical machine device and the control device, and wherein the control device is configured to control the optical machine device and the cooling device.

13. The projection display apparatus of claim 6, further comprising a cooling device and a control device, wherein the cooling device is configured to cool the optical machine device and the control device, and wherein the control device is configured to control the optical machine device and the cooling device.

14. The projection display apparatus of claim 1, further comprising a cooling device and a control device, wherein the cooling device is configured to cool the optical machine device and the control device, and wherein the control device is configured to control the optical machine device and the cooling device.

15. The projection display apparatus of claim 14, wherein the cooling device comprises:
   an air cooling device disposed opposite to the light emitting device and the modulation device; and
   a liquid cooling device comprising a heat dissipation patch attached to the outside of the light source.

16. The projection display apparatus of claim 14, further comprising a housing accommodating the optical machine device, the cooling device, and the control device.

17. The projection display apparatus of claim 1, wherein the projection display apparatus is one of an engineering projector, a cinema projector, a laser television, or a home theater.

18. The projection display apparatus of claim 1, wherein the projection display apparatus is an education projector.

19. The projection display apparatus of claim 1, wherein the projection display apparatus is a portable micro projector.

* * * * *